G. HERRMANN.
MIRROR GLASS FASTENER.
APPLICATION FILED MAY 20, 1916.
1,246,095.
Patented Nov. 13, 1917.
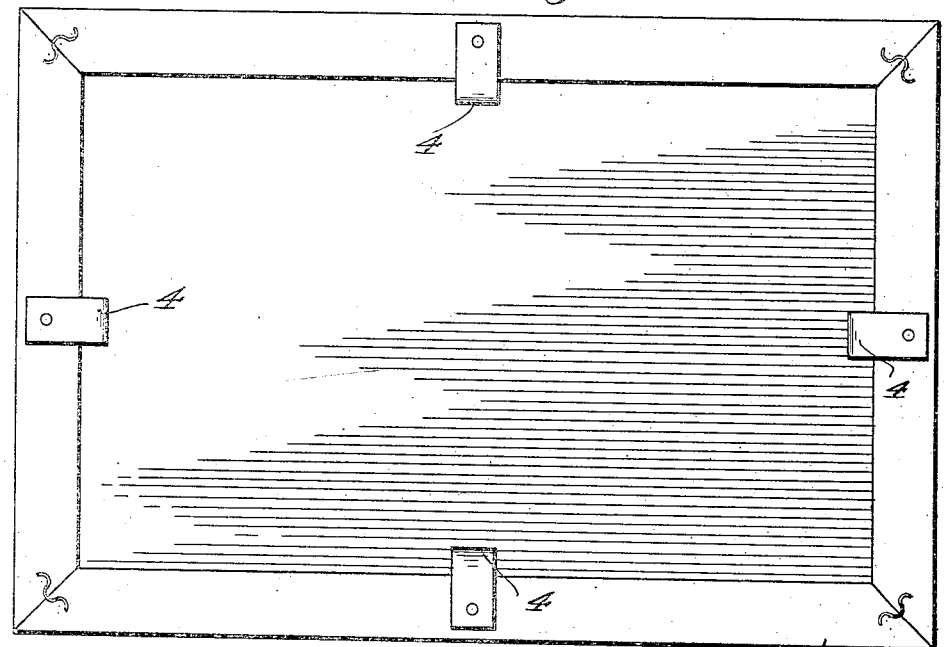
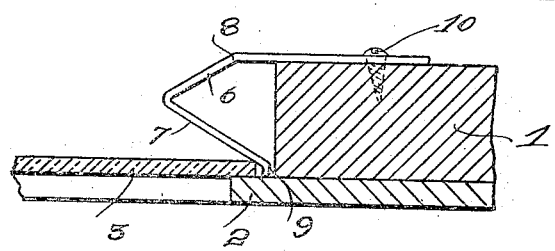
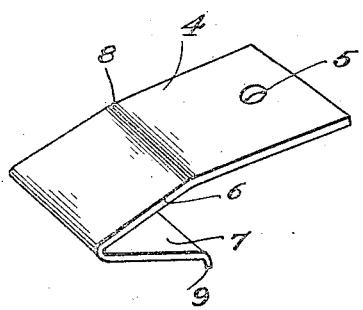
Gustav Herrmann,
Inventor
By Geo. P. Kimmel,
Attorney

UNITED STATES PATENT OFFICE.

GUSTAV HERRMANN, OF FORT SMITH, ARKANSAS.

MIRROR-GLASS FASTENER.

1,246,095.  Specification of Letters Patent.  Patented Nov. 13, 1917.

Application filed May 20, 1916. Serial No. 98,874.

*To all whom it may concern:*

Be it known that I, GUSTAV HERRMANN, a citizen of the United States, and resident of Fort Smith, in the county of Sebastian and State of Arkansas, have invented certain new and useful Improvements in Mirror-Glass Fasteners, of which the following is a specification.

The present invention relates to new and useful improvements in mirror frames and the like and has particular reference to an improved form of mirror retainer or fastener.

The primary object of my invention is to provide a fastening device for mirror glasses and the like which may be quickly and easily placed in position on a mirror frame in engagement with the mirror glass without danger of fracturing the glass. One of the greatest difficulties now encountered by those installing mirror glasses in frames is the danger of breaking the glass by hammering and the like.

It is therefore a further object of my invention to provide a fastening device which may be attached to a mirror frame for retaning the glass in position without the danger of breaking the glass even though the fastener be secured to the frame by nails or the like which might necessitate hammering.

Another object of my invention is to provide a fastener of the class described which is simple in construction, may be cheaply manufactured and will effectively perform the function for which the same has been designed.

Other objects and advantages to be derived from the use of my improved fastening device will appear from the following detail description and the claims, taken with an inspection of the accompanyng drawing, in which:

Figure 1 is a rear elevational view of a mirror and frame embodying the improvements of my invention and showing the fastening means in position;

Fig. 2 is a fragmental transverse sectional view of a portion of the mirror frame showing one of my improved fasteners in position; and Fig. 3 is an enlarged perspective view detached showing one of the fastening clips.

Referring more particularly to the drawing, wherein similar characters of reference designate like and corresponding parts throughout the various views, 1 designates the main frame of a mirror or the like, said frame having associated therewith a retaining flange 2. The mirror glass is shown and designated 3. Of course, it is to be understood that while I have placed particular stress upon the use of the device as a retainer for mirror glasses it will be readily understood by those skilled in the art that I do not limit myself to such use.

The retaining means of my invention comprise clips or fasteners designated 4 in their entirety carried by the rear portion of the mirror frame. In the present instance there are four of these fasteners shown arranged on the four sides of the frame, and since the same are identical in construction I will describe but one. Referring specifically to Figs. 2 and 3 the fasteners of my invention embodies a strip of spring metal or the like of suitable material having one end portion thereof provided with an opening 5 to accommodate a nail or the like. The other free end of the strip is provided with divergent portions 6 and 7, the portion 6 being angularly related with the main portion of the strip as indicated at 8. The free end of the divergent portion 7 is outwardly turned as at 9 to form a retainer flange to limit the lateral movement of the mirror glass 3.

In use a portion 4 of the fastener is secured by means of a nail 10 or the like to the rear face of the frame 1 so that the flange 9 falls between one marginal edge of the flange 3 and the inner side of the frame 1. The resiliency of the divergent arm portions 6 and 7 serves to cause the lateral arm portion to engage the fastener retaining the same in position without exerting a rigid pressure against the plate 3.

Thus it will be seen that I have provided a fastener for mirror glasses and the like which, while retaining the glass firmly in position and preventing the same from rattling, does not so grip the same to cause fracture of the glass, should the same expand or contract.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

1. The combination with a frame and a mirror, of a plurality of spring metal retaining clips each comprising a metal strip having one end secured to the frame and projecting inwardly, the other end of said strip being bent downwardly and rearwardly for engagement with the edges of the mirror to retain the same in the frame, and a flange on the free end of each strip adapted to be positioned between the edges of the mirror and the frame to limit the lateral movement of the mirror in said frame.

2. The combination with a frame and a mirror, of a plurality of spring metal retaining strips each comprising a metal strip having one end secured to the frame and projecting inwardly, said strips being bent laterally and back upon themselves in angularly spaced relation with their outer ends adapted to engage the edges of the mirror to retain the same in the frame, and laterally bent free extremities on the said strips adapted to be positioned between the edges of the mirror and the frame to limit the lateral movement of the mirror in said frame.

In testimony whereof, I affix my signature hereto.

GUSTAV HERRMANN.

Copies of this patent may be obtained for five cents each, by addressing the "Commissioner of Patents, Washington, D. C."